3,460,258
SINGLE POSITION EXTENSOMETER
Daniel Geary, Thomas E. McKewon, Richard S. Harris, and Herbert L. Bolen, Tulsa, Okla., assignors to Fenix & Scisson, Inc., a corporation of Oklahoma
Filed June 22, 1967, Ser. No. 648,112
Int. Cl. G01v 1/30
U.S. Cl. 33—1    7 Claims

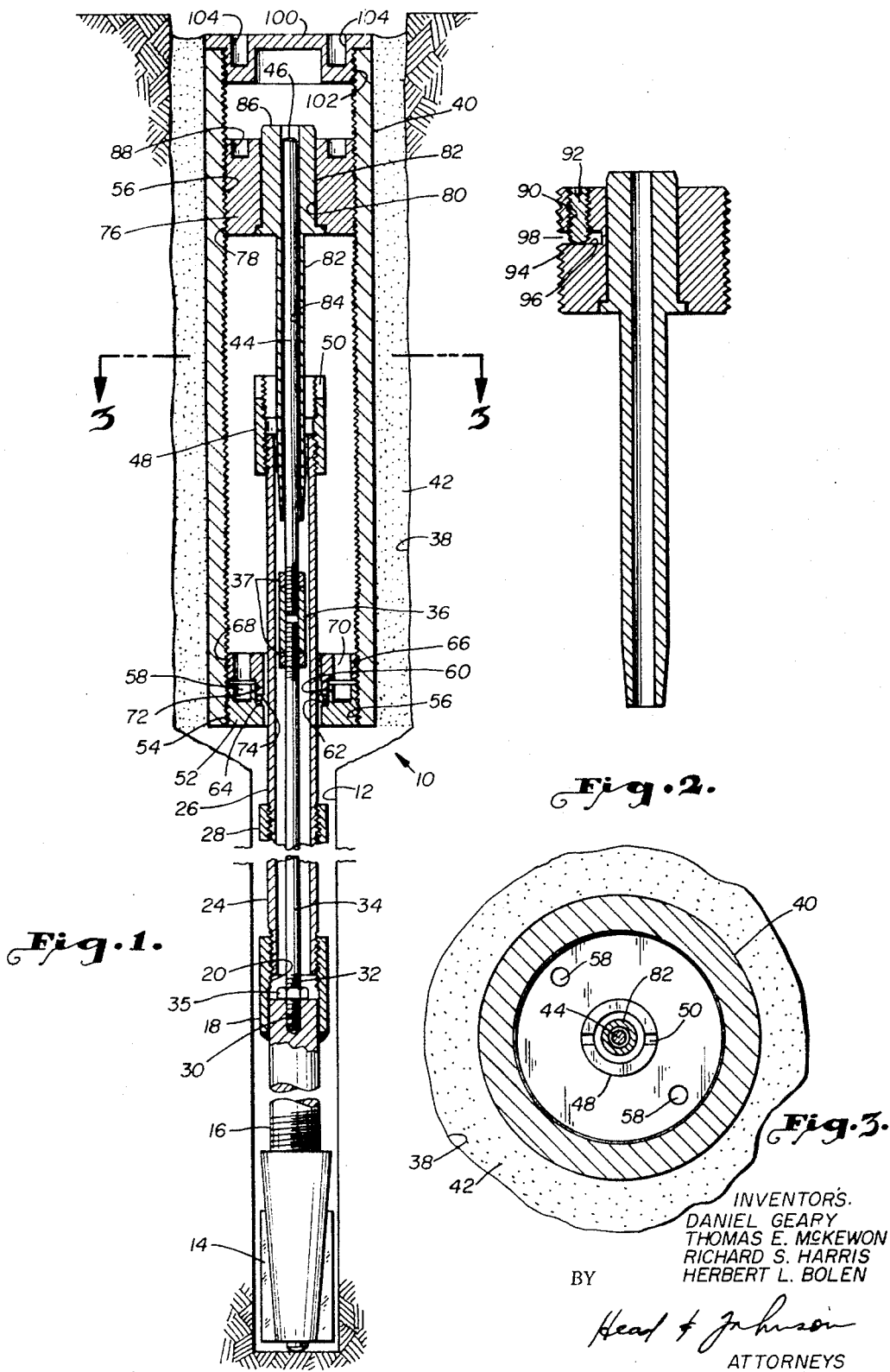

ABSTRACT OF THE DISCLOSURE

A device is described for measuring the movement of earth formations relative to the surface of the ground. One end of a rod string is anchored within the formation to be measured and terminates in a reference surface near the ground surface. A casing surrounds the rod string and is likewise anchored in the formation to be measured. A second casing extends downward a short distance from the earth surface and surrounds a portion of the anchored casing in sealing engagement to permit movement of the anchored casing while providing sealing means. The second casing includes a reference bushing which provides a reference surface for comparative measurement of distance from the reference surface of the rod string. Earth movement is determined by comparative measurements of this distance

BACKGROUND OF THE INVENTION

This invention relates to extensometers, and more particularly to extensometers used for measuring the deformation of earth formations in relation to the surface of the ground.

SUMMARY OF THE INVENTION

Extensometers are used to measure the movement of subterranean earth formations relative to the surface of the ground in order to determine the effect of this earth movement upon structures in and above the formations being observed. In its most basic form, an extensometer can be simply a small diameter rod string anchored at its lower end to a particular earth formation. Then, movement of the earth formation is observed by comparing the uppermost end of the extensometer with a stationary reference device on or near the surface of the ground. Many problems are encountered in providing an extensometer for this purpose, such as, providing a device of reasonable cost which will accomplish the task for which it is designed, providing suitable protection for the extensometer rod so that it will not be made inoperative by materials present in the various formations through which it passes, and providing suitable means for measuring the movement of the extensometer rod from this surface.

The primary object of this invention is to provide an extensometer which is simple and inexpensive to manufacture, easy to use, and which is durable and efficient in operation.

Another object of this invention is to provide an extensometer which is well protected from destructive materials and from other hazardous conditions within the formations through which the device passes during operation of the device.

Another object of this invention is to provide an extensometer in which measurement of the earth movement may be quickly, easily and accurately accomplished from the surface of the earth.

Further objects and advantages of the invention will become apparent from the following description and plans, and from the accompanying drawings, wherein:

FIGURE 1 is a sectional view of an extensometer according to this invention.

FIGURE 2 is a cross-sectional view of a reference bushing and probe of this invention rotated 90 degrees from their position in FIGURE 1.

FIGURE 3 is a sectional view along the line 3—3 of FIGURE 1.

DESCRIPTION OF THE PREFERRED EMBODIMENTS

An extensometer prepared according to this invention comprises anchor means adapted to be positionable at the bottom of a bore hole within an earth formation which is to be measured with reference to the surface of the earth, a string of casing attached to the anchor means and positioned within the bore hole, a rod string also attached to the anchor means and positioned within the lower string of casing in a manner that the upper end of the rod string extends upwardly in a bore hole beyond the upper end of the lower casing, and upper casing extending into the bore hole from the surface of the earth, the upper casing being of larger diameter than the aforesaid lower casing and extending downwardly from surface concentrically with and surrounding a portion of the upper end of the lower casing, the upper casing being in sealable and slidable engagement with the lower casing, and a reference bushing which is positionable within the upper casing and which bushing has a bore therethrough by means of which the distance between the upper end of the rod string and a reference surface on the reference bushing may be easily determined.

Referring now to the drawings in detail, FIGURE 1 describes an extensometer 10 as it would be when in position for use with its lower end anchored in a suitable earth formation and its upper end extending to the surface of the ground. The extensometer 10 is positioned within a previously drilled bore hole 12 which had been drilled to the desired depth, and is anchored in the earth formation at the bottom of the bore hole by means of rock bolt shell 14 threadably positioned on the end of rock bolt 16. Secured to that end of rock bolt 16 away from shell 14 is a coupling 18 having internal threads 20 to receive the external threads 22 of a first section of casing 24. Additional sections of casing 26 are added as necessary by means of a conventional threaded shoulder 28. Rock bolt 16 also has a threaded axial bore 30 which receives a threaded end 32 of a first section of rod 34. First section of rod 34 is locked in position by means of a lock nut 35. Additional sections of rod are added as necessary by means of cooperation of adjacent threaded ends with conventional rod couples 36. Rod couples 36 are secured in position by means of lock nuts 37. A large diameter bore hole 38 extends downward for a short distance from the surface of the ground and is concentric with bore hole 12. A section of large diameter casing 40 is cemented in place within bore hole 38 with conventional cement 42. Sections of casing 26 and rod 34 are added until a final section of casing 26 extends above the lower end of upper casing 40. A terminal rod section 44 extends a short distance above the final length of casing 26. Preferably, terminal rod section 44 is a polish rod and includes a machined upper surface 46 which is to be used as a reference surface. The final length of casing 26 has positioned thereon a slotted couple 48 which has on its upper end a pair of opposite slots 50 by means of which the casing string can be screwed into tight engagement and rock bolt 14 forced into a tight seat in the earth formation.

After the required number of casing sections and rod sections are installed sufficient to bring the end of the casing and rod string within the large diameter bore hole 38, a packer unit is positioned within upper casing 40 in order to form a seal between the interior of casing 40 and the bore hole surrounding the string of casings 26. As shown in FIGURE 1, this packer unit comprises a first packer member 52 which is screwed into place adjacent the lower end of casing 40 by cooperation of external threads 54 with internal threads 56 of casing 40. Packer member 52 includes a pair of recesses 58 which provide a means for a specialized wrench (not shown) to grasp packer 52 in order to position packer 52 properly in the lower end of casing 40. Packer 52 has an enlarged central bore 60 through a portion thereof which provides a shoulder 62 against which a resilient sealing member such as a rubber or neoprene O-ring 64 may be compressed between bore 60 and casing 26 to seal off the interior of casing 40. O-ring 64 is compressed by cooperation of a second packer member 66 which is screwed into place within casing 40 by cooperation of external threads 68 with internal threads 56 of casing 40. Packer member 66 includes bores 70 therethrough which provide a means for positioning packer member 66 in casing 40 by use of the specialized wrench mentioned above, which is simply a unit with extended prongs to provide a rotative movement to packers 52 and 66. Bores 70 are in alignment with recesses 58 so that packers 52 and 66 may be rotated together if desired. Packer member 66 also includes an elongated portion 72 which is machined to fit snugly within bore 60 of first packer 52. Then, surface 74 of elongated portion 72 will contract O-rings 64 to provide the necessary compressive force. O-rings 64 are preferably compressed a sufficient amount to preclude seepage of foreign material into casing 40 but not to a degree to preclude slight movement of casing 26, as casing 26 will move slightly with any movement of the earth formation within which rock bolt shell 14 is positioned.

As stated above, casing 26 and rod 44 move slightly with the earth formation in which rock bolt shell 14 is secured, while casing 40 retains its position relative to the surface of the earth. In order to measure this movement of the earth formation a reference bushing is inserted within casing 40 so that movement of rod 44 may be measured against this reference member. Preferably, the reference bushing is as shown in FIGURE 1 which describes a reference bushing 76 threadably inserted within bushing 40 by cooperation of external threads 48 with internal threads 56 of casing 40. Reference bushing 76 has a central bore 80 into which is securely positioned guide bushing 82. Guide bushing 82 has a central bore 84 which receives rod 44 and which is sufficiently larger than rod 44 so that rod 44 may move freely within bore 84 without binnding. The upper surface of guide bushing 82 is formed into a machined surface 86 which acts as a reference surface for accurate measurement of the distance to surface 46 of rod 44. Thus, when the extensometer components are properly installed within a bore hole the movement of rock bolt shell 14 relative to the surface of the earth can be registered by comparison of the vertical distance between machined surface 46 and machined surface 86. Preferably, casings 26 and rods 34 and 44 are arranged so that rod 44 extends a short distance upwards of couple 48 and reference bushing 76 is positioned so that surface 46 is a slight distance below surface 86. Relative movement of surfaces 46 and 86 can then be measured with an internal micrometer depth gauge. However, should movement of rod 44 cause surface 46 to protrude beyond surface 86, the relative movements can still be measured by use of a proper external micrometer. With secure positioning of rock bolt shell 14, rock bolt 16, casing 24 and 26, rod strings 34 and 44, as well as all the connecting couples measurement of earth movement can be measured down to one-thousandth of an inch. Reference bushing 76 includes recesses 88 which serve the same purpose as recesses 58 and 70, that is, they provide a means by which a specialized elongated wrench may be employed to rotate bushing 76 into its proper position. However, to insure that bushing 76 is maintained in a stable condition within casing 40, locking means are provided which comprises an internally threaded bore 90 as shown in FIGURE 2, into which a threaded Allen head screw 92 is positioned. Then the end portion 94 can be made to bear tightly against wall 96 of slotted portion 98. This places a stress upon the cooperating threads and causes them to bind together. To protect the internal components from water, debris and possible injury, a protective cap 100 is provided. Cap 100 also has external threads 102 which cooperate with threads 56 of casing 40. Also, cap 100 has a pair of recesses 104 which serve as a means for cooperating with a specialized tool to rotate cap 100 into proper position.

Since many different embodiments of this invention may be made without departing from the spirit and scope thereof, it is to be understood that the specific embodiments described in detail herein are not to be taken in a limiting sense.

What is claimed:

1. An extensometer apparatus comprising
   a bore hole anchor means adapted to be positionable at the bottom of a bore hole,
   a lower casing positionable in said bore hole and attachable at a first end to said anchor means,
   a rod string positionable within said casing and attachable at a first end to said anchor means, the upper end of said rod string extending upwardly in said bore hole beyond the upper end of said lower casing,
   an upper casing extending downward into said bore hole from the surface of the ground, said upper casing surrounding an upper portion of said rod string and being sealingly positioned around an upper portion of said lower casing, and
   a reference bushing threadably positionable within said upper casing, said bushing having a bore therethrough to permit measurement of the distance between a reference surface on said bushing and a reference surface on said upper end of said rod string, and including means at the upper end of said reference bushing by which said reference bushing can be rotated to a chosen position within said upper casing.

2. An extensometer as described in claim 1, wherein: said reference bushing includes a guide bushing positioned axially within said reference bushing and having a bore therethrough to permit passage of said upper end of said rod string, said guide bushing having a machined upper surface to provide said reference surface of said reference bushing.

3. An extensometer as described in claim 1 including means to lock said reference bushing in said chosen position.

4. An extensometer as described in claim 3, wherein: packing means is threadably mountable within said upper casing and surrounding said upper portion of said lower casing, said packing means including resilient sealing means positionable between said upper casing and said upper portion of said lower casing.

5. An extensometer as described in claim 4, wherein: said packing means includes a first packer member and second packer member, said sealing means includes a resilient sealing member positionable upon said first member, said second packer member being adjustably positionable adjacent said first packer member and said resilient sealing member to apply a compressive force to said sealing member.

6. An extensometer as described in claim 5, wherein: said lower casing includes a plurality of casing sections threadably coupled together, and a terminal couple member having means therein by which said terminal member can be rotated, and said rod string includes a plurality of rod sections threadably coupled together by means of couple members, a lock nut threadably engaging each rod section adjacent each couple member to lock said rod section in position, and a lock nut threadably engaging said road section at the first end of said rod string to lock said rod string position in said anchor means.

7. An extensometer as described in claim 6, wherein: said anchor means includes a rock bolt having a formation penetrating member adjacent a first end thereof.

References Cited

UNITED STATES PATENTS

| | | |
|---|---|---|
| 763,076 | 6/1904 | Spalding. |
| 1,708,333 | 4/1929 | Smith. |
| 2,656,715 | 10/1953 | Tolman. |
| 3,327,396 | 6/1967 | Waddell _____ 33—125 |
| 3,380,167 | 4/1968 | Abel et al. _____ 33—125 |

FOREIGN PATENTS 185,501  9/1966  U.S.S.R.

WILLIAM D. MARTIN, Jr., Primary Examiner

U.S. Cl. X.R.

29—132; 162—205